Feb. 2, 1965   J. MÜLLER ET AL   3,168,003
UNIVERSAL MACHINE TOOL
Filed Feb. 14, 1963   5 Sheets-Sheet 1

INVENTORS.
JOHANN MÜLLER
HORST LANZENBERGER
BY
ATTORNEY

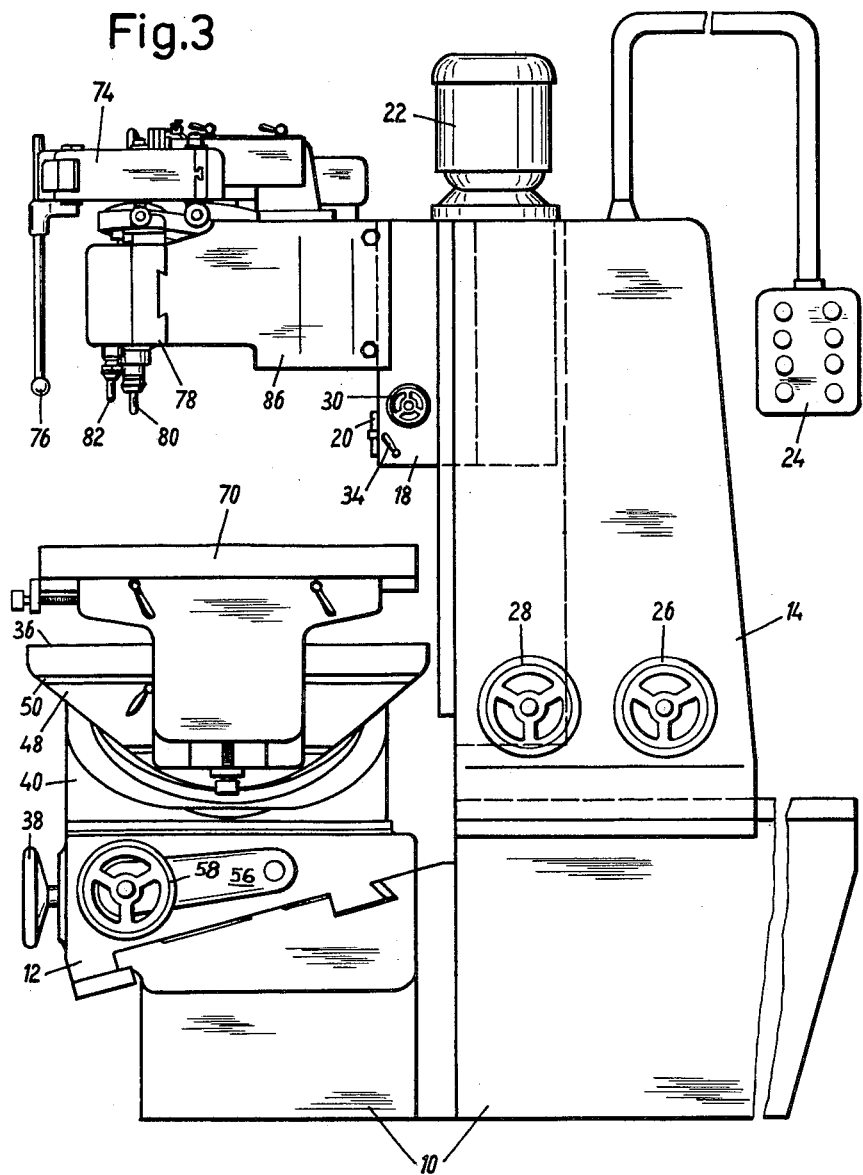

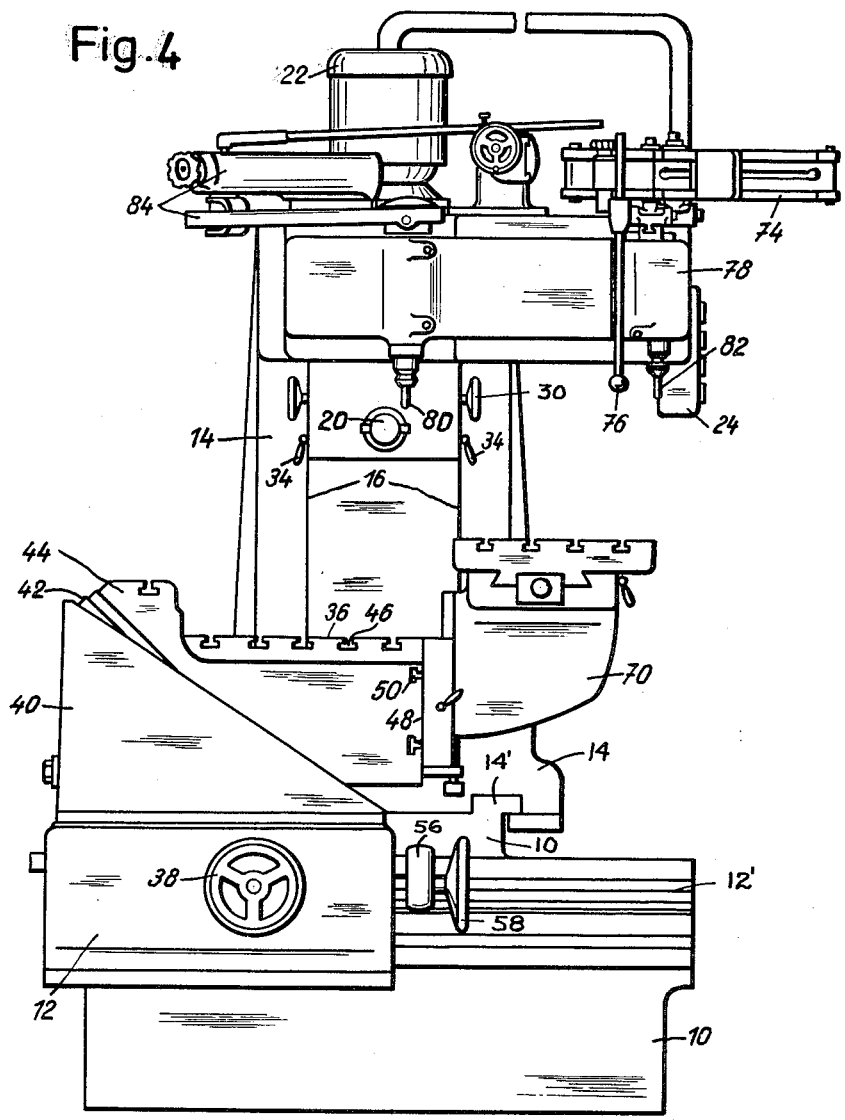

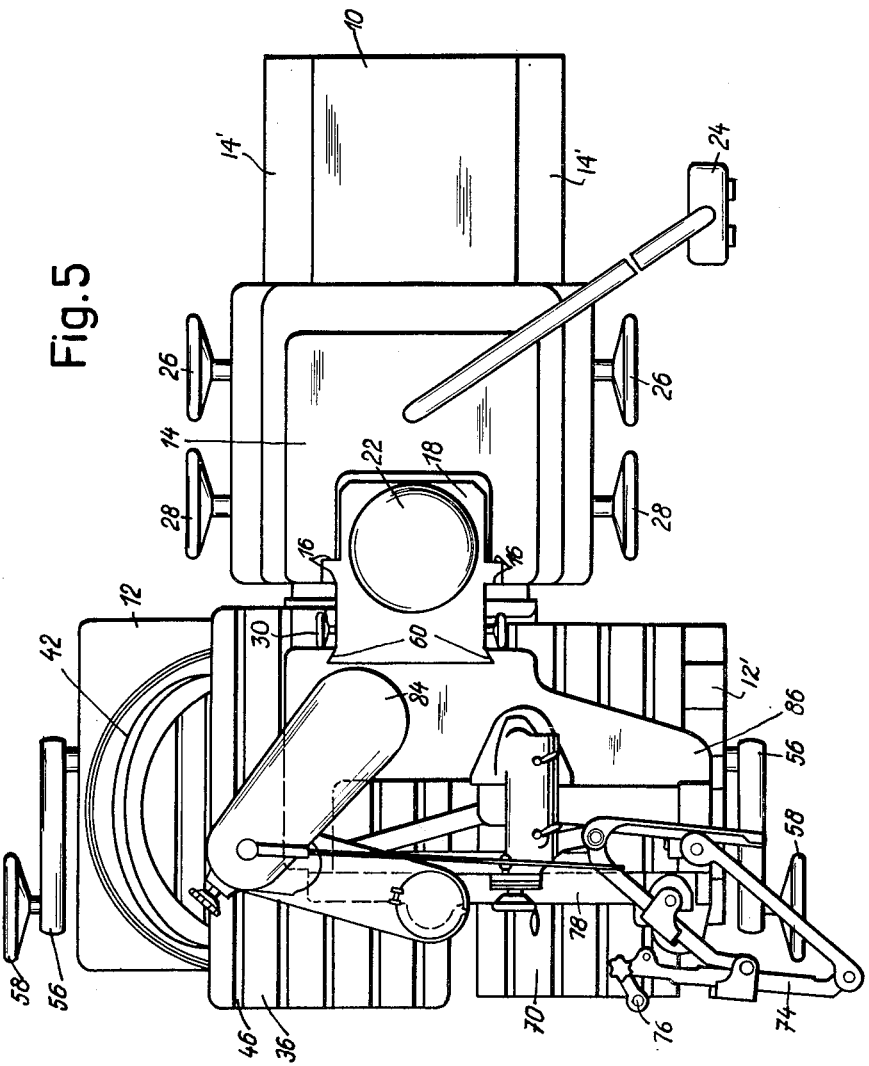

United States Patent Office 3,168,003
Patented Feb. 2, 1965

3,168,003
UNIVERSAL MACHINE TOOL
Johann Müller and Horst Lanzenberger, Munich, Germany, assignors to Hans Deckel, Munich, Germany, and Friedrich Wilhelm Deckel, Zug, Switzerland
Filed Feb. 14, 1963, Ser. No. 258,483
Claims priority, application Germany Feb. 27, 1962
11 Claims. (Cl. 90—13.1)

This invention is directed to a universal machine tool, and more particularly to a universal milling or profiling machine having a clamping table and a tool which are movable relative to each other in three coordinate directions.

The minimum design requirement that should be placed on any universal milling machine or the like is that it should be able to carry out all jobs in the horizontal and vertical planes. In order to satisfy this basic requirement, machines in the prior art are equipped either with a tool spindle capable of being swiveled between the horizontal and vertical planes, or with two separate tool spindles, namely a fixed horizontal spindle and a fixed vertical spindle.

Now if the cost outlay necessary for constructing machines with the three separate and different types of spindles, namely the fixed horizontal, fixed vertical and swiveled spindle, is measured and compared with the precision of the work produced by operators with each type machine and with the work which can be produced with each machine, in a given time, the fixed horizontal plane machine is found to be the best value machine, that is, the lowest in cost for the quality and quantity standard of work which can be produced with such machines.

The fixed horizontal spindle machine has the most favorable conditions with regard to the power flow and thus works and can be controlled more easily than the others. However, the familiar machines of the prior art cannot provide the beforementioned minimum requirement with only one such spindle.

It is, therefore, the main object of the present invention to provide a construction of universal machine tool which is able to carry out all manipulations and job requirements in the horizontal and vertical planes with only a single fixed spindle.

Another object of the invention is to provide a universal machine tool with a fixed horizontal spindle in which the clamping table and tool spindle are movable relative to each other in three coordinate directions so that all operations in the vertical and horizontal planes can be performed.

Another object of the invention is to provide a fixed spindle universal machine tool capable of performing all vertical and horizontal job operations with either a horizontal or a vertical clamping surface.

Still another object of the invention is to provide a fixed horizontal spindle profiling machine in which the workpiece may be clamped on a horizontal clamping surface and the profiling work may be carried out on a vertical surface of the workpiece to provide better operator observation of the work and a more favorable arrangement for removal of chips and coolants.

A further object of the invention is to provide a construction of a fixed horizontal spindle machine tool having means for connecting a hand operated fine-profiling vertical spindle pantograph device thereto for performing jobs of very great precision at high working speeds.

Still a further object of the invention is to provide a universal machine tool with a fixed horizontal spindle which is relatively simple in construction, economical to manufacture and easily manipulatable to carry out all machining operations in the horizontal and vertical planes.

Other and further objects of the invention are set forth more fully in the specification, hereinafter following, by reference to the accompanying drawings, in which:

FIG. 3 is a side elevational view of the basic machine of FIGS. 1 and 2, shown on an enlarged scale and foreshortened, and particularly showing a hand profiling pantograph device connected to the horizontal spindle carriage with the clamping table rotated 90° from the position shown in FIG. 1;

FIG. 4 is a front elevational view of the hand operated universal profiling machine of FIG. 3; and FIG. 5 is a top plan view of the universal machine tool of FIGS. 3 and 4.

Figure 1:
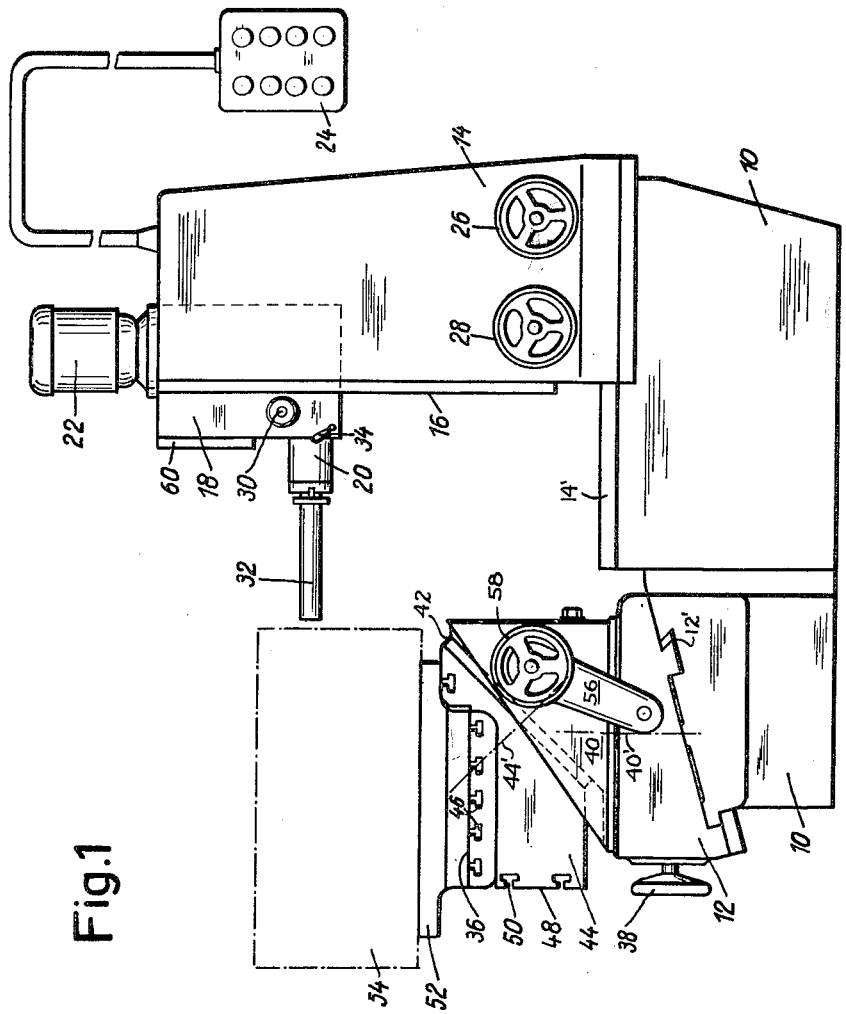
FIG. 1 is a side elevational view of the machine tool of the invention arranged as a universal milling machine with a horizontal cutter bar, and showing in dot-dash lines a workpiece clamped to a clamping surface disposed in the horizontal position.
Figure 2:
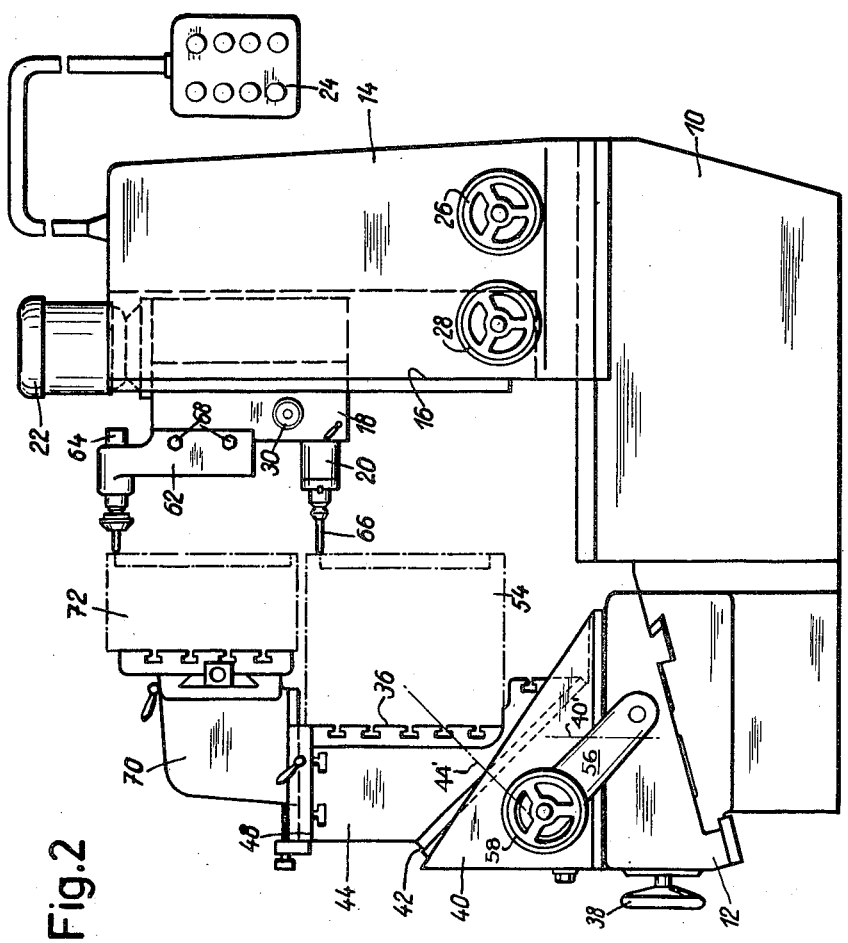
FIG. 2 is a side elevational view similar to FIG. 1, but showing the machine of the invention arranged as a universal profiling machine with a tracer connected above the cutting spindle and the workpiece and pattern connected to the clamping table with the clamping surface thereof pivoted 180° from the position shown in FIG. 1.

The invention is directed to a novel construction of a universal machine tool which can be arranged as a milling machine as shown in FIG. 1, or as an automatic profiling machine as shown in FIG. 2, or as a hand profiling machine as shown in FIGS. 3–5, which is equipped with a single fixed horizontal tool spindle and which can carry out all cutting, milling or profiling operations in the horizontal and vertical planes. This versatility is brought about by the combination of a fixed horizontal spindle disposed adjacent a clamping table whose clamping surface is mounted to rotate around a first axis disposed at substantially 45° to the plane of the clamping surface and also disposed to rotate around a second axis which is disposed substantially normal to the plane of the clamping surface and at substantially 45° to the first axis. This dual swivel axis clamping table makes it possible to work with the clamping surface swiveled into the vertical plane or swiveled into the horizontal plane, and is of the type as shown and described in our copending application entitled "Dual Swivel Axes Clamping Table." With the combination of the fixed horizontal spindle and the dual swivel clamping table the additional vertical spindle can be omitted from the machine tool as required in the prior art machines, and the alternate construction for enabling the spindle to be swiveled from one plane to another can also be eliminated without hindering any manipulation of the machine for carrying out all horizontal and vertical job operations. A special advantage of the universal machine tool of the invention is that, even when it is desired to use the work clamping surface in a vertical plane, the workpiece which may be rather large and heavy, can be clamped on the clamping surface when the same is disposed in the horizontal plane, making the clamping operation much easier and simpler and enabling the clamping surface carrying the workpiece to then be pivoted or swiveled into the desired vertical plane for the milling or profiling operation.

Referring to the drawings in greater detail, reference character 10 indicates the machine bed having upper surfaces with guides 14' and 12' disposed at right angles to each other. The workpiece clamping table base member indicated generally at 12 is connected for longitudinal displacement along guide 12' while pedestal body portion 14 is connected for displacement along guide 14' in a direction substantially crosswise to the displacement of clamping table base member 12. As shown more particularly in FIGS. 1 and 5, pedestal body portion 14 carries vertical guides 16 on the vertical face adjacent the clamping table and a carriage 18 is mounted thereon for selective vertical displacement. As indicated in FIG. 5, a portion of carriage 18 extends within a channel in pedestal body portion 14 and a retractible horizontal working spindle 20 is connected therein, extending in the direction of the clamping table. Referring more particularly to FIG. 1, in which the machine tool of the invention is shown arranged as a universal milling machine, a cutter bar 32 carrying a cutting edge on its extreme end is connected in working spindle 20, in the usual manner, which serves as a milling spindle rotatively driven through gearing not shown, by motor 22 mounted on the top portion of carriage 18. In addition to rotatively driving spindle 20 motor 22 also serves as the power source for axially feeding and retracting spindle 20 relative to carriage 18.

The drive for the remaining feeds of the machine tool, namely, the drive for longitudinally moving pedestal body portion 14 along guide 14' and the drive for vertically positioning carriage 18 along guides 16 is provided by a separate motor, not shown, connected in the machine bed 10 or in the pedestal body portion 14 through conventional suitable gearing mechanisms, not shown. A switchboard 24 is swivelly connected through a conduit to the top of pedestal 14 as shown, and carries a plurality of switches which are electrically connected to motor 22 and the pedestal drive motor for allowing the switching and operation of all drives to be accomplished from the switchboard.

In addition to automatic electrical operation of all the drives by selected motor control from switchboard 24, all movements of the pedestal and carriage can be carried out by hand operation and for this purpose hand wheel links with conventional type gearing are provided for movement of the various members along their associated guides. Hand wheel 26 is provided for the pedestal feed, that is, for manual movement of the pedestal along guide 14' in cross-direction. Hand wheel 28 is connected to pedestal 14 and to carriage 18 through suitable gearing for adjusting the height of carriage 18 relative to the machine bed 10, and hand wheel 30 is connected on carriage 18 for axially displacing working spindle 20 from the extended position, as shown in FIG. 1, to the retracted position as shown in FIG. 3. After the spindle 20 has been adjusted to the desired axial position it is clamped or locked into position by means of a hand locking lever 34 which is connected on carriage 18 and extends into locking engagement with the spindle. As shown in FIG. 5, duplicate sets of manual operating hand wheels are arranged on both sides of the pedestal 14 so that the machine can be manually operated from both sides at the convenience of the operator.

On the longitudinally displaceable workpiece clamping table base member 12 is arranged a chuck, the clamping surface 36 of which can be swung into any desired position between the horizontal and the vertical planes. This chuck consists of a diagonally cut off cylinder piece 40, swivelably connected to base member 12 through a pivot, the center line of which is indicated at 40', with cylinder piece 40 being rotatable relative to base member 12 by means of a hand wheel 38 and interconnecting gearing not shown. Cylindrical piece 40 provides a round slide 42, which is inclined at an angle of 45° to the horizontal, and a body portion 44, which likewise can be swiveled by means of the hand wheel 38, through gearing not shown, is pivotally connected to round slide 42 of member 40 through a pivot whose center axis is indicated at 44'. The first turning axis 44' intersects the clamping surface 36 inwardly of its mid-point and is positioned so that it extends in the vicinity of the center of gravity of the combined masses, 44, 36, 52, and 54, which turn about this axis so that little effort is needed to rotate the clamping surface from the horizontal position of FIG. 1 to the vertical position of FIG. 2, even when a relatively large and heavy workpiece 54 is disposed on the table.

The body portion 44 carries the main workpiece clamping surface 36 having chuck grooves 46 therein, inclined at an angle of 45°, to its turning axis 44' and to the round slide 42. An auxiliary clamping surface 48, having chuck grooves 50 therein, is carried on the end of body portion 44 opposite the end in engagement with slide 42 with the auxiliary clamping surface disposed perpendicular to main clamping surface 36. In FIG. 1 a rotatable turntable device 52 is shown clamped on main clamping surface 36 with the workpiece 54 carried thereon so that the workpiece can selectively be adjusted in space, relative to the tool 32 without having to reclamp the workpiece. It is to be understood, however, that the workpiece can be clamped directly to surface 36 but the addition of the turntable tends to make the machine more versatile.

Rotatable hand wheels 58 connected on swiveling extension arms 56, which in turn are connected to workpiece clamping table base member 12, are connected by gearing, not shown, for longitudinally moving base member 12 along guide 12'. Gearing of standard type construction, not shown, is provided in base member 12 and cylindrical piece 40 for rotation of piece 40 relative to member 12 and for rotation of body portion 44 relative to piece 40 and base member 12. Both of these independent swiveling operations are accomplished by hand wheel 38 with piece 40 being rotatable when the hand wheel is pulled out and body portion 44 being rotatable when the hand wheel is pushed inwardly toward base portion 12.

The vertical rotational axis or second turning axis 40' of the piece 40 does not extend through the center of the clamping surface 36, as in prior art machines, but rather extends in the vicinity of the center of the combined mass which turns about the axis. With the positioning of the axis relative to the clamping surface, the distance of the clamping surface 36 from the spindle 20 is changed upon rotation of the clamping surface about this axis. In this way, even long workpieces can be processed on the grinding face without the necessity of reclamping them to process an adjacent face and without having to make allowance for a large invariable spacing between the table and tool after the same has been rotated. A more complete explanation of the clamping table is disclosed in our copending application for "Dual Swivel Axes Clamping Table" which is incorporated herein by reference.

The machine of the invention shown in FIG. 2 is of the same basic structure as the machine shown in FIG. 1, but showing the machine arranged as a universal profiling machine. As shown in FIGS. 1 and 5 vertical guides 60 are provided on carriage 18 above tool spindle 20 which can serve for the attachment of a back-stop thereto, or, as shown in FIG. 2, for the attachment of a supplemental device with a tracer which is necessary for universal profiling machines. The supplemental device shown consists of a holder 62 engaged on vertical guides 60 with the holder carrying a horizontal displaceable tracer 64 arranged above tool 66 and extending in relative alignment thereto. The tracer holder 62 can be clamped on guides 60 at different spaced intervals from tool 66 by means of screws 68 which engage the guides. In FIG. 2 the main clamping surface 36 is shown swiveled to the vertical position with workpiece 54 shown in dot-dash lines, connected thereto, and a pattern table indicated generally at 70, which is displaceable in two coordinate directions, is shown clamped to clamping surface 48 for positioning the pattern 72 adjacent the tracer 64 while workpiece 54 is positioned adjacent profiling tool 66 in spindle 20. As tracer 64 traverses the pattern 72, tool 66 cuts workpiece 54 to a corresponding shape under control of the switches on switchboard 24. Pattern table 70 is of the usual design and a more complete explanation of the operation of the same herein is not considered essential.

In the profiling machine shown in FIG. 2, the loading of the workpiece and pattern on to the table can be undertaken with clamping surfaces disposed in horizontal position. The clamping surfaces can then be rotated to the vertical position as shown so that the profiling work can be carried out on a vertical surface of the workpiece. Special advantages of this sort of execution of profiling jobs, such as better observation for the machine operator, and a more favorable arrangement for removal of chips and coolants should be apparent to one familiar with problems encounted in this art. The aspect of the machine which provides more favorable removal of coolants is especially significant for the machine profiling with automatic feeds and correspondingly greater work output, since work output and life of the tool are especially dependent upon a favorable arrangement for supplying and removing coolants from the working surfaces.

According to a further characteristic of the invention, the universal machine tool, as shown in FIGS. 3–5, may be equipped with a fine-profiling device for fine and precision smoothing operations which are preferably activated by hand and performed by a vertical spindle particularly suited for this type operation, in lieu of the tracer holder 62 shown in FIG. 2. In the hand-operated profiling machine, shown in FIGS. 3–5, a hand-profiling device of familiar design known in the art, is connected on vertical guides 60 above spindle 20, as shown. Such a hand-operated profiling device is recommended for the production of reshaping jobs requiring very great precision at high working speeds, since, with automatic profiling machines, which depend upon the number of cycles of their control device, up to now still cannot achieve with reasonable output any reshaping at equal precision, and more particularly this precision has not been obtainable at the same time a work speed worthy of mention is achieved. The advantages of a horizontal spindle machine, previously mentioned, are not important for the fine smoothing operation by hand which follows the automatic pre-roughing, for in the fine smoothing operation only chips of very slight thickness are removed from the workpiece so that the high output, otherwise necessary for vertical spindles for large work outputs, is removed. Thus when using a vertical spindle for smoothing operations only, a lower output can be used thereby making the use of a vertical spindle profiling device attachment ideally suited to the present machine for performing smoothing operations.

The hand-profiling device consists essentially of a pantograph 74 which is manually guided by means of the depending handle 76. The pantograph which is connected between cross slide 78 and the associated carrier 86 serves not only for changing the transmission ratio in the usual manner, but also serves for changing the power transmission for the activation of the cross slide 78 slidably connected to profiling carrier frame 86 which is connected to vertical guides 60 of the pedestal carrier 18. Cross slide 78 is arranged to carry the rotatable cutting tool 80 and tracer 82 in spaced relation, with the driving motor for tool 80, not shown, disposed within profiling device carrier frame 86 and mechanically geared to drive the tool through the pivoted angle drive indicated generally at 84 extending between the motor and carrier frame 86 and the tool in cross slide 78. When the pantograph hand-profiling device is used, the spindle 20 is retracted within carrier 18 as shown and the clamping table base member is moved longitudinally to one end of slide 12' with clamping surface 36 rotated to a horizontal position beneath cutting tool 80 with the clamping surface of pattern table 70 positioned beneath tracer 82.

The machine of the invention as described herein thus represents a universal machine tool with which all jobs required of a universal milling machine, a horizontal boring mill, and of a profiling machine can be carried out. With equal success the construction of the machine according to the invention can also be adapted for grinders, particularly on universal surface grinding machines. A similar result can also be achieved on turning machines in which case the tool support in the spindle 20 is exchanged for a workpiece clamping device, such as a chuck, while the clamping surface 36 or the clamping surface of the round pattern table 70 is provided with a suitable steel or turning tool holder.

While the invention has been described in certain of its preferred embodiments it is realized that modifications can be made and it is to be understood that no limitations upon the scope of the invention are intended other than may be imposed by the scope of the appended claims.

What we claim as new, and desire to secure by Letters Patent of the United States, is as follows:

1. A universal machine tool of the type having a clamping table and a tool means which are movable relative to each other in three coordinate directions, the improvement comprising, in combination, a fixed horizontal tool axis means connected to said tool means, a clamping surface adapted to receive a workpiece carried by said clamping table, said clamping surface disposed for swiveling around a first pivot axis means on said clamping table disposed at substantially 45° to said clamping surface, and said clamping surface disposed for rotation around a second pivot axis means vertically disposed on said clamping table and at substantially 45° to said first pivot axis means for selectively positioning all sides of a workpiece clamped on said clamping surface adjacent said fixed horizontal tool axis means for work thereon, thereby providing a more stable fixed horizontal tool axis means.

2. A universal machine tool as set forth in claim 1 in which said machine is arranged as a milling machine.

3. A universal machine tool as set forth in claim 1 including a horizontally disposed tracer connected to said tool means above said fixed horizontal tool axis means for movement therewith.

4. A universal machine tool as set forth in claim 1 including a supplementary device removably connected to said tool means above said fixed horizontal tool axis means, and a horizontally disposed tracer connected to said supplementary device to provide a profiling milling machine.

5. A universal machine tool as set forth in claim 1 in which said fixed horizontal tool axis means comprises a relatively short horizontal spindle head carrying a cutting tool extending toward said clamping surface and including vertical guide means carried by said tool means above and adjacent said spindle head, a supplementary device removably connected to said vertical guide means, clamping means connected for tightly securing said supplementary device to said vertical guide means, and a horizontally disposed profiling tracer connected to said supplementary device in alignment with and above said cutting tool.

6. A universal machine tool as set forth in claim 1 including vertical guide means carried by said tool means adjacent and above said fixed horizontal tool axis means, fine profiling tool means having a vertically disposed tracer and a vertically disposed rotatable cutting tool means connected thereto in spaced relation removably connected to said vertical guide means for performing fine smoothing operations on all surfaces of a workpiece on said clamping surface, and pantograph means connected to said fine profiling tool means for manually activating and guiding said cutting tool means and said tracer, whereby rough working operation may be performed on all surfaces of the workpiece by said fixed horizontal tool axis means while the surfaces are vertically disposed and fine smoothing operation may be performed by said vertically disposed cutting tool on all workpiece surfaces while horizontally disposed.

7. A universal machine tool as set forth in claim 1 including a second clamping surface disposed for swiveling with said first-mentioned clamping surface, said second clamping surface connected substantially above and perpendicular to said first-mentioned clamping surface when the latter is swiveled into the vertical position.

8. A universal machine tool as set forth in claim 7 including pattern table means connected to said second clamping surface, said pattern table means carrying a third clamping surface adapted for receiving a profiling pattern, and said third clamping surface disposed perpendicular to the plane of said second clamping surface and connected for parallel displacement relative to the plane of said first-mentioned clamping surface.

9. A universal machine tool as set forth in claim 1 in which said first-mentioned clamping surface is disposed to be swiveled about a pivot axis means standing perpendicular to its plane when disposed in the horizontal position.

10. A universal machine tool as set forth in claim 7 and in which said second clamping surface is disposed to be swiveled about a pivot axis means standing perpendicular to the plane thereof when said first-mentioned clamping surface is swiveled into the vertical plane.

11. A universal machine tool comprising in combination, a machine base, horizontal guide means carried by said base at substantially right angles to each other, table means connected for movement longitudinal of the base on one of said guide means, an upstanding pedestal disposed for movement along the other of said guide means in a direction substantially crosswise to the direction of movement of said clamping table means, a relatively short fixed horizontal tool spindle carried by said pedestal and adapted to receive a cutting tool extending toward the path of movement of said table means, said table means including a clamping surface disposed for swiveling around a first pivot axis means carried by said table means and disposed at an acute angle to said clamping surface, and said clamping surface also disposed for swiveling around a second pivot axis means carried by said table means and disposed in the vertical plane and at substantially the same acute angle to said first pivot axis means, to provide a universal machine tool in which the clamping surface and fixed horizontal tool spindle are movable relative to each other in three coordinate directions and in which all surfaces of a workpiece carried by said clamping surface can be selectively positioned by said clamping surface adjacent said fixed horizontal tool spindle for operation thereon by the fixed horizontal tool spindle, whereby greater stability of said fixed horizontal tool spindle is attained.

References Cited in the file of this patent

UNITED STATES PATENTS

| 2,034,240 | Kremer et al. | Mar. 17, 1936 |
| 2,956,344 | Rantsch | Oct. 18, 1960 |
| 3,085,477 | Zwick | Apr. 16, 1963 |

FOREIGN PATENTS

| 807,880 | Germany | July 5, 1951 |
| 1,203,134 | France | July 27, 1959 |